United States Patent
Kunisawa

(10) Patent No.: US 7,470,742 B2
(45) Date of Patent: Dec. 30, 2008

(54) RUBBER COMPOSITION FOR COVERING CARCASS CORD AND TIRE HAVING CARCASS USING SAME

(75) Inventor: Tetsuya Kunisawa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/808,728

(22) Filed: Jun. 12, 2007

(65) Prior Publication Data

US 2008/0015308 A1 Jan. 17, 2008

(30) Foreign Application Priority Data

Jul. 13, 2006 (JP) .............................. 2006-192511

(51) Int. Cl.
*C08F 220/56* (2006.01)
(52) U.S. Cl. .................... 524/547; 524/572; 525/331.9; 525/332.4; 525/342; 525/343
(58) Field of Classification Search .............. 525/331.9, 525/343, 332.4, 342; 524/547, 572
See application file for complete search history.

(56) References Cited

U.S. PATENT DOCUMENTS

| 4,421,899 A | 12/1983 | Yamazaki et al. |
| 6,533,008 B1 * | 3/2003 | Lickes et al. ............. 152/209.5 |

FOREIGN PATENT DOCUMENTS

| EP | 1077228 A1 | 2/2001 |
| EP | 1323549 A2 | 7/2003 |
| EP | 1652693 A1 | 5/2006 |
| EP | 1686151 A1 | 8/2006 |
| EP | 1690895 A1 | 8/2006 |
| EP | 1792937 A1 | 6/2007 |
| JP | 10-139939 A | 5/1998 |
| JP | 10-251514 A | 9/1998 |
| JP | 2002-20550 A | 1/2002 |
| JP | 2002-128960 A | 5/2002 |
| JP | 2003-63206 A | 3/2003 |
| JP | 2003-73502 A | 3/2003 |
| JP | 2004-43627 A | 2/2004 |

* cited by examiner

*Primary Examiner*—Bernard Lipman
(74) *Attorney, Agent, or Firm*—Birch, Stewart, Kolasch & Birch, LLP

(57) ABSTRACT

The present invention provides a rubber composition for covering a carcass cord, which makes it possible to consider an effect on environment, prepare for decrease in supply quantity of petroleum resources in future, reduce rolling resistance and improve rubber strength and processability, and a tire prepared by using the rubber composition. The rubber composition for covering a carcass cord of the present invention comprises 25 to 80 parts by mass of silica, 1 to 15 parts by mass of a silane coupling agent and 3 to 30 parts by mass of an organic vulcanizing agent represented by the following general formula (1): —$(R-S_x)_n$— wherein R is —$(CH_2-CH_2-O)_m-CH_2-CH_2-$; x is an integer of 2 to 6; n is an integer of 10 to 400; and m is an integer of 2 to 5, based on 100 parts by weight of a diene rubber, and a tire prepared by using the rubber composition.

5 Claims, No Drawings

RUBBER COMPOSITION FOR COVERING CARCASS CORD AND TIRE HAVING CARCASS USING SAME

BACKGROUND OF THE INVENTION

The present invention relates to a rubber composition for covering a carcass cord and a tire having a carcass using the rubber composition.

Since big load is generally applied to tires for an automobile, a carcass cord is used as a reinforcing material. In particular, when the carcass cord is peeled from a rubber due to heat generation in tires during running, it causes a fatal tire trouble.

Raw materials derived from petroleum resources such as carbon black have been used for a rubber composition for covering a carcass cord. However, in recent years, there has been an increasing interest in global environmental conservation and there is no exception in automobiles, and regulations on $CO_2$ emission has been made more rigorous. Further, petroleum resources are finite and its supply quantity has been decreasing year by year. Therefore, a steep rise of petroleum price is anticipated in future and there is a limit in using raw materials such as carbon black and synthetic rubbers derived from petroleum resources. Therefore, considering petroleum depletion in future, it is necessary to use non-petroleum resources such as a natural rubber and white fillers such as silica and calcium carbonate. However, in such a case, there is required reinforcing property such as rubber strength equal to or better than that of a conventional rubber composition using petroleum resources as main component.

As a method of reducing rolling resistance, a method of using silica which is a raw material derived from resources other than petroleum has been known (refer to JP2003-63206A). When silica is compounded, rolling resistance is reduced, and also a ratio of raw materials derived from petroleum resources can be reduced, thereby making it possible to consider an effect on environment and prepare for decrease in supply quantity of petroleum in future. However, reduction of rolling resistance is not sufficient, and rubber strength is not superior to that of a tire produced by using raw materials derived from petroleum resources as main component. Therefore, improvements are still required in either of performances.

SUMMARY OF THE INVENTION

It is an object of the present invention to provide a rubber composition for covering a carcass cord that makes it possible to consider an effect on environment, prepare for decrease in supply quantity of petroleum resources in future, reduce rolling resistance and improve rubber strength and processability, and a tire having a carcass prepared by using the rubber composition.

The present invention relates to a rubber composition for covering a carcass cord comprising:
25 to 80 parts by mass of silica,
1 to 15 parts by mass of a silane coupling agent and
3 to 30 parts by mass of an organic vulcanizing agent represented by the following general formula (1):

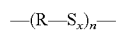

wherein R is $-(CH_2-CH_2-O)_m-CH_2-CH_2-$; x is an integer of 2 to 6; n is an integer of 10 to 400; and m is an integer of 2 to 5,
based on 100 parts by mass of a diene rubber.

It is preferable that the diene rubber comprises 85 to 100% by mass of a natural rubber.

It is preferable that the silane coupling agent is represented by the following general formula (2):

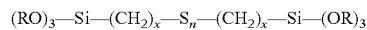

wherein R is a linear or branched alkyl group having 1 to 8 carbon atoms; x is an integer of 1 to 8; n represents the number of sulfur atoms at a polysulfide portion and the average value of n is 2 to 3, and a content of the silane coupling agent in which the number of sulfur atoms at the polysulfide portion is 2 is not less than 60% by mass of the total silane coupling agent.

Further, the present invention relates to a tire having a carcass prepared by using the rubber composition for covering a carcass cord.

DETAILED DESCRIPTION

The rubber composition for covering a carcass cord of the present invention comprises a diene rubber, silica, a silane coupling agent and a specific organic vulcanizing agent.

The diene rubber is not particularly limited and examples of the diene rubber are, for instance, a natural rubber (NR), an isoprene rubber (IR), an epoxidized natural rubber (ENR), a styrene-butadiene rubber (SBR), a butadiene rubber (BR), an acrylonitrile-butadiene rubber (NBR), a chloroprene rubber (CR), and an ethylene-propylene-diene rubber (EPDM). These diene rubbers may be used alone and two or more thereof may be used in combination. Among these, NR and/or ENR are preferable and NR is more preferable because it is possible to consider an effect on environment, prepare for decrease in supply quantity of petroleum resources in future and reduce rolling resistance.

As for NR, NR of grades such as RSS#3 and TSR20 that have been used in the rubber industry can be used.

A content of NR in the rubber component is preferably not less than 85% by mass, more preferably not less than 95% by mass. When the content of NR is less than 85% by mass, the ratio of the raw material derived from resources other than petroleum cannot be increased. Therefore, it is impossible to consider an effect on environment, and prepare for decrease in supply quantity of petroleum resources in future, and further rolling resistance tends to be increased. In particular, the content of NR is most preferably 100% by mass.

Silica is not particularly limited, and those prepared by a dry process or a wet process are exemplified.

The nitrogen adsorption specific surface area ($N_2SA$) of silica is preferably not less than 70 $m^2/g$, more preferably not less than 80 $m^2/g$, further preferably not less than 90 $m^2/g$. When the $N_2SA$ of silica is less than 70 $m^2/g$, an adequate reinforcing effect by containing silica tends not to be obtained. Further, the $N_2SA$ of silica is preferably not more than 250 $m^2/g$, more preferably not more than 150 $m^2/g$, further preferably not more than 130 $m^2/g$. When the $N_2SA$ of silica exceeds 250 $m^2/g$, Mooney viscosity is excessively raised and processability in covering a carcass cord tends to be lowered. The $N_2SA$ of silica can be measured in accordance with ASTM-D-4820-93.

A content of silica is not less than 25 parts by mass, preferably not less than 30 parts by mass, more preferably not less than 40 parts by mass based on 100 parts by mass of the rubber component. When the content of silica is less than 25 parts by mass, a ratio of the non-petroleum resources cannot be increased, and thus, it is impossible to consider an effect on environment and prepare for decrease in supply quantity of petroleum resources in future, and further reinforcing property is remarkably deteriorated. Further, the content of silica is not more than 80 parts by mass, preferably not more than 75 parts by mass. When the content of silica exceeds 80 parts by mass, rolling resistance is increased, and further, Mooney viscosity is excessively raised and processability is lowered.

Preferred examples of the silane coupling agent are those represented by the following general formula (2):

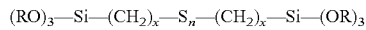

$(RO)_3\text{—}Si\text{—}(CH_2)_x\text{—}S_n\text{—}(CH_2)_x\text{—}Si\text{—}(OR)_3$ wherein R is a linear or branched alkyl group having 1 to 8 carbon atoms; x is an integer of 1 to 8; n represents the number of sulfur atoms at a polysulfide portion and the average value of n is 2 to 3, for the reason that these silane coupling agents are preferable for tires when comprehensively examining reactivity with silica, processability, cost and the like.

In the aforementioned general formula (2), R is preferably a linear or branched alkyl group and more preferably a linear alkyl group.

The number of carbon atoms of R is preferably 1 to 8, more preferably 2 to 7. When the number of carbon atoms of R is 0, no alkoxy group exists and reactivity of silica with the silane coupling agent tends to be damaged. When the number of carbon atoms of R exceeds 8, affinity of silica with the silane coupling agent tends to be damaged.

x is preferably 1 to 8, more preferably 2 to 7. When x is 0, the silane coupling agent is chemically unstable and decomposition and deterioration of the silane coupling agent in the rubber composition tend to be accelerated. When x exceeds 8, the amount of the silane coupling agent necessary for obtaining an adequate reinforcing effect tends to be excessively increased.

n represents the number of sulfur atoms at a polysulfide portion. The average value of n is preferably 2 to 3. When the average value of n is less than 2, the decomposition temperature of the silane coupling agent is heightened and kneading can be carried out at a higher temperature, but vulcanization rate tends to be increased. When n exceeds 3, the decomposition temperature of the silane coupling agent is low, and the silane coupling agent easily decomposed during the kneading to discharge a sulfur atom, and therefore, rubber scorch tends to be generated during the kneading.

Based on the total silane coupling agent in the rubber composition for covering a carcass cord of the present invention, a content of the silane coupling agent in which the number of sulfur atoms in the polysulfide portion is 2 (silane coupling agent with n of 2) is preferably not less than 60% by mass, more preferably not less than 65% by mass. When the content of the silane coupling agent with n of 2 is less than 60% by mass, the decomposition temperature of the silane coupling agent is comparatively lowered, the silane coupling agent is easily decomposed during kneading and processability tends to be lowered.

Examples of the silane coupling agent are, for instance, bis(3-triethoxysilylpropyl)disulfide, bis(2-triethoxysilylethyl)disulfide, bis(3-trimethoxysilylpropyl)disulfide, bis(2-trimethoxysilylethyl)disulfide, bis(4-triethoxysilylbutyl)disulfide, bis(4-trimethoxysilylbutyl)disulfide, bis(triethoxysilylpropyl)disulfide and the like. These silane coupling agents may be used alone or two or more thereof may be used in combination. Bis(3-triethoxysilylpropyl)tetrasulfide and the like which are used conventionally as a silane coupling agent do not satisfy the formula (2).

The amount of the silane coupling agent is preferably not less than 1 part by mass, preferably not less than 2 parts by mass based on 100 parts by mass of the rubber component.

When the amount of the silane coupling agent is less than 1 part by mass, an adequate reinforcing effect by containing the silane coupling agent is not obtained. Further, the amount of the silane coupling agent is preferably not more than 15 parts by mass, more preferably not more than 12 parts by mass. When the amount of the silane coupling agent exceeds 15 parts by mass, Mooney viscosity is excessively raised and processability is lowered.

As for the organic vulcanizing agent, there is used an organic vulcanizing agent having a structure represented by the following general formula (1):

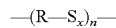

$\text{—}(R\text{—}S_x)_n\text{—}$ wherein R is $\text{—}(CH_2\text{—}CH_2\text{—}O)_m\text{—}CH_2\text{—}CH_2\text{—}$; x is an integer of 2 to 6; n is an integer of 10 to 400; and m is an integer of 2 to 5, because a polymer containing sulfur atoms in its molecule is used in place of sulfur in order to improve both of rubber strength and rolling resistance property.

In the formula (1), x is 2 or more and preferably 3 or more. When x is less than 2, vulcanization is delayed. Further, x is 6 or less and preferably 5 or less. When x exceeds 6, production of the rubber composition is difficult.

In the formula (1), n is 10 or more and preferably 50 or more. When n is less than 10, the organic vulcanizing agent is easily vaporized and handling is difficult. Further, n is 400 or less and preferably 300 or less. When n exceeds 400, compatibility with the rubber is deteriorated.

In the formula (1), m is 2 or more. When m is less than 2, the bending property of the obtained rubber composition is lowered. Further, m is 5 or less and preferably 4 or less. When m exceeds 5, an adequate hardness of the rubber composition cannot be obtained.

Examples of such organic vulcanizing agents are, for instance, poly-3,6-dioxaoctane-tetrasulfide (2OS4 available from KAWAGUCHI CHEMICAL INDUSTRY CO., LTD.).

It is preferable that the organic vulcanizing agent used in the present invention dose not contain Si, because it is used as a cross-linking agent for a polymer and is not used for binding a polymer and silica.

An amount of the organic vulcanizing agent is not less than 3 parts by mass, preferably not less than 5 parts by mass, more preferably not less than 10 parts by mass based on 100 parts by mass of the diene rubber. When the amount of the organic vulcanizing agent is less than 3 parts by mass, adequate reinforcing property is not obtained. Further, the amount of the organic vulcanizing agent is not more than 30 parts by mass, preferably not more than 25 parts by mass. When the amount of the organic vulcanizing agent exceeds 30 parts by mass, the hardness of the rubber is remarkably increased and the rubber becomes frangible.

The organic vulcanizing agent can also be used together with sulfur that has been used as a vulcanizing agent in the tire industry.

In the present invention, there can be provided a rubber composition for covering a carcass cord comprising specified amounts of the diene rubber, silica, silane coupling agent and specific organic vulcanizing agent, thereby making it possible to consider an effect on environment and prepare for decrease in supply quantity of petroleum resources in future. Further, rolling resistance is reduced and rubber strength and processability are improved in comparison with a rubber composition for covering a carcass cord prepared by using petroleum resources as main components. There also can be provided an economical and ecological tire, making it possible to consider an effect on environment and prepare for decrease in supply quantity of petroleum resources in future.

An object of the rubber composition for covering a carcass cord of the present invention is to consider an effect on environment and prepare for decrease in supply quantity of petroleum resources in future by comprising non-petroleum resources as main components. Therefore, it is preferable not to use carbon black and the like.

In the rubber composition for covering a carcass cord of the present invention, compounding agents, for example, a softening agent, various antioxidants, stearic acid, zinc oxide, a vulcanizing agent such as sulfur and various vulcanization accelerators that have been used in the tire industry can be suitably compounded according to necessity, in addition to the aforementioned rubber components, silica, silane coupling agent and organic vulcanizing agent.

The rubber composition for covering a carcass cord of the present invention can be produced by a usual method. Namely, the aforementioned rubber component, silica, silane coupling agent, organic vulcanizing agent and, if required, other compounding agents are kneaded with a Banbury mixer, kneader, open roll or the like and then the kneaded product is vulcanized to obtain the rubber composition for covering a carcass cord of the present invention.

The tire of the present invention can be produced by a usual method using the rubber composition for covering a carcass cord of the present invention. Namely, the rubber composition for covering a carcass cord of the present invention in which the aforementioned compounding agents are compounded according to necessity is, in an unvulcanized state, formed into unvulcanized rubber sheets with a film shape having a thickness of at most 1 mm by using a calender roll or the like. Line speed is suitably adjusted so that the rubber composition dose not excessively generate heat. The unvulcanized rubber sheets are covered on carcass cords to obtain unvulcanized carcasses and then the obtained unvulcanized carcasses are molded with other tire members on a tire molding machine by a usual method to obtain unvulcanized tires. The tire of the present invention is obtained by heating and pressurizing the unvulcanized tire in a vulcanizer.

Thus, the tire of the present invention prepared by using the rubber composition for covering a carcass cord of the present invention can be an ecological tire which makes it possible to consider an effect on environment and prepare for decrease in supply quantity of petroleum resources in future.

EXAMPLE

The present invention is explained in detail based on Examples, but the present invention is not limited only to these.

Next, various chemicals used in Examples and Comparative Examples are explained below.

Natural rubber (NR): TSR 20

Epoxidized natural rubber (ENR): ENR25 available from Malaysian Rubber Board (MRB).

Styrene-butadiene rubber (SBR): SBR1502 available from JSR Co., Ltd.

Carbon black: DIABLACK H (N330, $N_2SA$: 79 m$^2$/g) available from Mitsubishi Chemical Corporation Silica: Z115GR ($N_2SA$: 112 m$^2$/g) available from Rhodia LTD.

Silane coupling agent (1): Si75 available from Degussa GmbH (bis(triethoxysilylpropyl)disulfide represented by:

$(RO)_3$—Si—$(CH_2)_x$—$S_n$—$(CH_2)_x$—Si—$(OR)_3$ wherein R is $C_2H_5$; x is 3; content of the silane coupling agent with n of 2 is 75% by mass; average value of n is 2.35.

Silane coupling agent (2): Si69 available from Degussa GmbH (bis(3-triethoxysilylpropyl)tetrasulfide) represented by:

$(RO)_3$—Si—$(CH_2)_x$—$S_n$—$(CH_2)_x$—Si—$(OR)_3$ wherein R is $C_2H_5$; x is 3; content of the silane coupling agent with n of 2 is 20% by mass; average value of n is 3.57.

Process oil: DIANA PROCESS PS32 available from Idemitsu Kosan Co., Ltd.

Stearic acid: stearic acid "KIRI" available from NOF CORPORATION.

Zinc oxide: ZINC OXIDE No. 1 available from Mitsui Mining And Smelting Company, Limited Organic vulcanizing agent: 2OS4 available from KAWAGUCHI CHEMICAL INDUSTRY CO., LTD. (poly-3,6-dioxaoctane-tetrasulfide) represented by:

—$(R—S_x)_n$— wherein R is —$(CH_2$—$CH_2$—$O)_m$—$CH_2$—$CH_2$—; x is 4; n is 200; and m is 2.

Sulfur: CRISTEX HSOT20 available from FLEXIS Co., Ltd. (insoluble sulfur containing 80% by weight of sulfur and 20% by weight of oil content)

Vulcanization accelerator: NOCCELER NS available from Ouchi Shinko Chemical Industrial CO., LTD. (N-tert-butyl-2-benzothiazolylsulfenamide)

Examples 1 to 5 and Comparative Examples 1 to 6

Chemicals other than sulfur and a vulcanization accelerator were filled according to the compounding prescription shown in Table 1 in a 1.7 L Banbury mixer manufactured by Kobe Steel Ltd. so that the filling rate was 58% and were kneaded until 150° C. was reached for 3 minutes at 90 rpm, to obtain kneaded articles. Then, sulfur and a vulcanization accelerator were added to the obtained kneaded articles and were kneaded under the condition of 90° C. for 3 minutes using a calendar roll, while adjusting the line speed to 20 rpm so as to suppress rising of Mooney viscosity. Thus unvulcanized rubber sheets with a thin film shape having a thickness of 0.7 mm were obtained. Further, the vulcanized rubber sheets of Examples 1 to 5 and Comparative Examples 1 to 6 were prepared by vulcanizing the obtained unvulcanized rubber sheets, under the condition of 175° C. for 10 minutes. The sulfur content of the organic vulcanizing agent used in Examples is about 50% and since the sulfur exists within its molecule, cross-linking effect of the organic vulcanizing agent is smaller than that of sulfur. Therefore, in order to obtain the same level of cross-linking density as in the case of sulfur, a required amount of the organic vulcanizing agent is as large as five times the amount of sulfur. Thus, Example 2 and Comparative Example 2 can be directly compared with each other.

(Rubber Strength)

No. 3 dumbbell type test pieces were prepared using the vulcanized rubber sheets, and tensile test was carried out in accordance with JIS K6251 "Vulcanized rubber and Thermoplastic rubber—Determination of tensile property" and strength at break (TB) and elongation at break (EB) were measured to calculate their product (TB×EB). The larger the TB×EB is, the more superior the rubber strength is.

(Rolling Resistance)

Carcass cords were covered with the aforementioned unvulcanized rubber sheets, to prepare unvulcanized carcasses, which were laminated with other tire members and then vulcanized under the condition of 175° C. for 10 minutes to prepare test tires (tire size: 195/65R15).

Rolling resistance was measured using a rolling resistance tester manufactured by STL Co., Ltd. when running the obtained test tires under the conditions of rim: 6JJ×15, inner pressure: 230 kPa, load: 49 N and speed: 80 km/h. The rolling resistance index of Comparative Example 1 was referred to as 100 and the rolling resistance of each of the compoundings was represented by an index. The larger the rolling resistance index is, the more the rolling resistance is reduced and the more superior it is.

(Rolling resistance index)=(Rolling resistance of Comparative Example 1)÷(Rolling resistance of each of compoundings)×100

(Processability)

Test pieces were cut out from the aforementioned unvulcanized rubber sheets and according to JIS K 6300 "Test Method of Unvulcanized Rubbers", Mooney viscosity of the respective unvulcanized rubber compositions was measured using a Mooney viscosity tester "Mooney viscometer SMV-202" manufactured by Shimadzu Corporation. Namely, after preheating for 1 minute, a small rotor was rotated under the temperature condition of 130° C. and after a lapse of 4 minutes, Mooney viscosity was measured respectively. Mooney viscosity index of Comparative Example 1 was referred to as 100 and Mooney viscosity of each of compoundings was represented by an index according to the following equation. The smaller the Mooney viscosity is, the easier the processing is and thus, processability is more excellent.

(Mooney viscosity index)=(Mooney viscosity of each of compoundings)÷(Mooney viscosity of Comparative Example 1)×100

Evaluation results of the above-mentioned tests are shown in Table 1.

In Examples 1 to 5 where specified amounts of silica, silane coupling agent and specific organic vulcanizing agent are compounded, raw materials derived from resources other than petroleum are used as main components, thereby making it possible to consider an effect on environment and prepare for decrease in supply quantity of petroleum resources in future. Further, rolling resistance can be reduced and rubber strength and processability can be improved in comparison with the rubber composition prepared in Comparative Example 1 where a large amount of raw materials derived from petroleum resources are contained.

On the other hand, in Comparative Examples 2 to 6, the rubber compositions are lack in any of essential elements of the present invention and there are no rubber compositions excellent in all of rubber strength, rolling resistance and processability.

According to the present invention, there can be provided a rubber composition for covering a carcass cord which comprises specified amounts of a rubber component, silica, silane coupling agent and specific organic vulcanizing agent, thereby making it possible to consider an effect on environment, prepare for decrease in supply quantity of petroleum resources in future, reduce rolling resistance and improve rubber strength and processability, and a tire having a carcass prepared by using the rubber composition.

The invention claimed is:

1. A rubber composition for covering a carcass cord comprising:
    a diene rubber,
    25 to 80 parts by mass of silica based on 100 parts by mass of the diene rubber,
    1 to 15 parts by mass of a silane coupling agent based on 100 parts by mass of the diene rubber, and

TABLE 1

|  | Example | | | | | Comparative Example | | | | | |
|---|---|---|---|---|---|---|---|---|---|---|---|
|  | 1 | 2 | 3 | 4 | 5 | 1 | 2 | 3 | 4 | 5 | 6 |
| Amounts (part by mass) | | | | | | | | | | | |
| NR | 100 | 100 | 100 | 90 | 50 | 70 | 100 | 100 | — | 100 | 100 |
| ENR | — | — | — | 10 | 50 | — | — | — | — | — | — |
| SBR | — | — | — | — | — | 30 | — | — | 100 | — | — |
| Carbon black | — | — | — | — | — | 50 | — | — | — | — | — |
| Silica | 50 | 50 | 50 | 50 | 50 | — | 50 | 50 | 50 | 50 | 50 |
| Silane coupling agent (1) | 4 | 4 | 4 | 4 | 4 | — | 4 | 4 | 4 | — | — |
| Silane coupling agent (2) | — | — | — | — | — | — | — | — | — | 4 | — |
| Process oil | 7 | 7 | 7 | 7 | 7 | 7 | 7 | 7 | 7 | 7 | 7 |
| Stearic acid | 2 | 2 | 2 | 2 | 2 | 2 | 2 | 2 | 2 | 2 | 2 |
| Zinc oxide | 5 | 5 | 5 | 5 | 5 | 5 | 5 | 5 | 5 | 5 | 5 |
| Organic vulcanizing agent | 3 | 15 | 30 | 15 | 15 | — | — | 35 | 15 | 15 | 15 |
| Sulfur | 1 | — | — | — | — | 3 | 3 | — | — | — | — |
| Vulcanization accelerator | 1 | 1 | 1 | 1 | 1 | 1 | 1 | 1 | 1 | 1 | 1 |
| Evaluation Results | | | | | | | | | | | |
| TB × EB | 6700 | 6900 | 6500 | 6850 | 6800 | 6100 | 6450 | 5900 | 6500 | 6600 | 5800 |
| Rolling resistance index | 103 | 105 | 108.5 | 105 | 104 | 100 | 102.5 | 110 | 88 | 102 | 93 |
| Processability | 95 | 90 | 85 | 88 | 91 | 100 | 99 | 80 | 103 | 88 | 108 |

In Comparative Example 1, there is used a rubber composition for covering a carcass cord comprising carbon black but not comprising the specific organic vulcanizing agent and therefore, comprising a large amount of raw materials derived from conventional petroleum resources.

3 to 30 parts by mass of an organic vulcanizing agent represented by the formula (1) based on 100 parts by mass of the diene rubber:

wherein R is —$(CH_2-CH_2-O)_m-CH_2-CH_2-$; x is an integer of 2 to 6; n is an integer of 10 to 400; and m is an integer of 2 to 5, wherein said diene rubber comprises 85 to 100% by mass of a natural rubber.

2. The rubber composition for covering a carcass cord of claim 1, wherein the silane coupling agent is represented by the formula (2):

$(RO)_3-Si-(CH_2)_x-S_n-(CH_2)_x-Si-(OR)_3$ wherein R is a linear or branched alkyl group having 1 to 8 carbon atoms; x is an integer of 1 to 8; n represents the number of sulfur atoms at a polysulfide portion and the average value of n is 2 to 3, and a content of the silane coupling agent in which the number of sulfur atoms at the polysulfide portion is 2 is not less than 60% by mass of the total silane coupling agent.

3. A tire having a carcass prepared by using the rubber composition for covering a carcass cord of claim 1.

4. A tire having a carcass prepared by using the rubber composition for covering a carcass cord of claim 2.

5. The rubber composition for covering a carcass cord of claim 1, wherein the diene rubber comprises 95 to 100% by mass of the natural rubber.

* * * * *